United States Patent
Stijohann

(10) Patent No.: US 11,422,928 B2
(45) Date of Patent: Aug. 23, 2022

(54) METHOD, DEVICE AND TEST PROGRAM FOR RECOGNIZING A WEAK POINT IN AN ORIGINAL PROGRAM

(71) Applicant: Siemens Aktiengesellschaft, Munich (DE)

(72) Inventor: Jan Stijohann, Munich (DE)

(73) Assignee: SIEMENS AKTIENGESELLSCHAFT

( * ) Notice: Subject to any disclaimer, the term of this patent is extended or adjusted under 35 U.S.C. 154(b) by 0 days.

(21) Appl. No.: 16/650,313

(22) PCT Filed: Sep. 28, 2018

(86) PCT No.: PCT/EP2018/076492
§ 371 (c)(1),
(2) Date: Mar. 24, 2020

(87) PCT Pub. No.: WO2019/063801
PCT Pub. Date: Apr. 4, 2019

(65) Prior Publication Data
US 2020/0278921 A1   Sep. 3, 2020

(30) Foreign Application Priority Data
Sep. 29, 2017   (EP) .................................... 17193932

(51) Int. Cl.
G06F 11/36 (2006.01)
G06F 21/60 (2013.01)
G06F 11/34 (2006.01)

(52) U.S. Cl.
CPC ...... G06F 11/3692 (2013.01); G06F 11/3476 (2013.01); G06F 11/3664 (2013.01); G06F 11/3688 (2013.01); G06F 21/602 (2013.01)

(58) Field of Classification Search
CPC ......................................... G06F 11/3668–3696
(Continued)

(56) References Cited

U.S. PATENT DOCUMENTS 5,758,061 A * 5/1998 Plum .................... G06F 11/3676
714/35
7,877,735 B2 * 1/2011 Todorova .................. G06F 8/63
717/169
(Continued)

FOREIGN PATENT DOCUMENTS

EP   2261802 A1   12/2010

OTHER PUBLICATIONS

Software Testing, Wikipedia, Mar. 3, 2016, 24 pages, [retrieved on Apr. 6, 2022], Retrieved from the Internet: <URL:https://web.archive.org/web/20160303073550/https://en.wikipedia.org/wiki/Software_testing>.*

(Continued)

*Primary Examiner* — Geoffrey R St Leger
(74) *Attorney, Agent, or Firm* — Schmeiser, Olsen & Watts LLP

(57) ABSTRACT

Provided is a method for recognizing a weak point in an original program using a test program, the original program being configured to perform a predetermined function on input data when executed in a predetermined runtime environment and the test program being configured to execute the same predetermined function on the input data when executed in the predetermined runtime environment, including:

executing the original program and the test program in parallel on identical input data in the predetermined runtime environment;
obtaining a test information characterizing the execution of the test program; and
determining whether the original program has a weak point based on a comparison of the test information with a predetermined weak point information indicating conditions for recognizing weak points.

(Continued)

Weak points of a program can be determined dynamically, without having to perform a time consuming testing in an artificial test environment.

11 Claims, 2 Drawing Sheets

(58) Field of Classification Search
USPC .................................. 717/124–127, 131–135
See application file for complete search history.

(56) References Cited

U.S. PATENT DOCUMENTS

| | | | |
|---|---|---|---|
| 8,239,836 B1* | 8/2012 | Franz | G06F 11/1487 |
| | | | 717/127 |
| 8,713,531 B1 | 4/2014 | Pettis et al. | |
| 9,098,621 B2* | 8/2015 | Zheng | G06F 11/3672 |
| 9,417,895 B2* | 8/2016 | Safari | G06F 9/542 |
| 9,852,290 B1* | 12/2017 | Kirk | G06F 21/566 |
| 9,983,982 B1* | 5/2018 | Kumar | G06F 11/3664 |
| 10,296,443 B2* | 5/2019 | Grechanik | G06F 11/079 |
| 2003/0093772 A1* | 5/2003 | Stephenson | G06F 11/3612 |
| | | | 717/130 |
| 2003/0200462 A1 | 10/2003 | Munson | |
| 2006/0161897 A1* | 7/2006 | Biberstein | G06F 11/3632 |
| | | | 717/124 |
| 2012/0151453 A1 | 6/2012 | Finking et al. | |
| 2012/0222013 A1* | 8/2012 | Zheng | G06F 11/3672 |
| | | | 717/125 |
| 2015/0081988 A1* | 3/2015 | Bonetta | G06F 9/38 |
| | | | 711/155 |
| 2015/0095894 A1 | 4/2015 | Tripp | |
| 2017/0103013 A1* | 4/2017 | Grechanik | G06N 7/005 |

OTHER PUBLICATIONS

Deployment Environment, Wikipedia, Feb. 10, 2016, 5 pages, [retrieved on Apr. 6, 2022], Retrieved from the Internet: <URL: https://web.archive.org/web/20160210173937/https://en.wikipedia.org/wiki/Deployment_environment>.*

PCT International Search Report and Written Opinion of International Searching Authority dated Jan. 14, 2019 corresponding to PCT International Application No. PCT/EP2018/076492 filed Sep. 28, 2018.

European Search Report for Application No. 17193932.5, dated Mar. 19, 2018.

* cited by examiner

METHOD, DEVICE AND TEST PROGRAM FOR RECOGNIZING A WEAK POINT IN AN ORIGINAL PROGRAM

CROSS-REFERENCE TO RELATED APPLICATIONS

This application claims priority to PCT Application No. PCT/EP2018/076492, having a filing date of Sep. 28, 2018, which is based off of EP Application No. 17193932.5, having a filing date of Sep. 29, 2017, the entire contents both of which are hereby incorporated by reference.

FIELD OF TECHNOLOGY

The following relates to a method for recognizing a weak point in an original program using a test program, to a test program for recognizing a weak point in an original program and to a device for recognizing a weak point in an original program using a test program.

BACKGROUND

It can be desired to perform tests on a newly developed original program to recognize its weak points and make sure it functions as expected. The original program can for example be tested in an artificial test environment, in which artificially created data is used as an input when executing the original program. The result of the test performed in the artificial test environment may then be analyzed by a security analyst to detect weak points of the original program.

The document US 2015/0095894 A1 discloses a testing of computer software applications in which first and second executable portions of the computer software application are identified, the portions being configured to access a data resource, and at least one of the portions being configured to write to the data resource. The computer software application is instrumented by inserting one or more instrumentation instructions into one or both of the portions, where the instrumentation instruction is configured to cause execution of the portion being instrumented to be extended by a randomly-determined amount of time. The computer software application is tested in multiple iterations, where the computer software application is executed in multiple parallel execution threads, where the portions are independently executed at least partially in parallel in different threads, and where the computer software application is differently instrumented in each of the iterations.

Document U.S. Pat. No. 8,713,531 B1 discloses a computer implemented software testing method including: receiving a bug report regarding software under test; storing the bug report in a computer readable data store upon receiving the bug report; setting a status indicator for the bug report to an oven condition upon storing the bug report; requesting execution of a test procedure corresponding to the bug report; executing the test procedure using a processor; receiving a test result from the processor indicating a pass state or a fail state for the test procedure, and setting the status indicator for the bug report to a closed condition if the pass state is determined for the test procedure.

SUMMARY

An aspect relates to improve a recognition of a weak point in an original program.

According to a first aspect, a method for recognizing a weak point in an original program using a test program is provided, the original program being configured to perform a predetermined function on input data when executed in a predetermined runtime environment and the test program being configured to execute the same predetermined function on the input data when executed in the predetermined runtime environment as the original program. The method comprises:

executing the original program and the test program in parallel on identical input data in the predetermined runtime environment;

obtaining a test information characterizing the execution of the test program; and determining whether the original program has a weak point based on a comparison of the test information with a predetermined weak point information indicating conditions for recognizing weak points.

The predetermined runtime environment may be the environment in which the original and/or the test program can successfully be executed. To successfully execute the original and/or test program, the predetermined runtime environment in particular comprises adequate libraries, subsystems such as databases, network infrastructures and the like.

The original program may comprise a set of instructions that perform the predetermined function when executed in the predetermined runtime environment. For example, the predetermined function can be a calculation realized with data from a sensor in an industrial network. The original program can be stored on a hardware entity to form an original device. The original program itself may be software.

The test program may comprise the same set of instructions as the original program. In particular, when executed, the test program can perform all the function that the original program can perform. The test program may be seen as a copy of the original program. Beyond being configured to execute the same functions as the original program when executed, the test program may also execute additional functions such as testing functions, which will be described below. The test program can be stored on a hardware entity to form a test device, or it can be stored on the same hardware as the original device. The test program itself may be software.

The test program may constantly be run or executed in parallel to the original program. In the present application, "in parallel" in particular means at the same time and with the same input data. In particular, the test program receives the same input data as the original data and performs the same predetermined function, for example a same calculation. In embodiments, the input data can initially be provided to the original program and then be transmitted to the test program, the input data can initially be provided to the test program and then be transmitted to the original program, or the input data can be provided to both the original and the test program at the same time, for example through an interface, in particular through a broadcast interface.

In particular, when the test program is executed, it accesses the same libraries and databases from the predetermined runtime environment as the original program and uses the information from the libraries and databases in the same way as the original program. The test program can be run or executed in the same runtime environment as the original program.

The test information may be generated upon execution of the test program. The test information may indicate how the test program is executed. In particular, it tracks events occurring when the test program is executed. Test information examples will be discussed further below.

A weak point may be a flaw in the original and/or test program, in particular in the code thereof. For example, if the predetermined function cannot be executed as expected for given input data, a weak point is detected. For example, a weak point is recognized upon occurrence of race conditions, insecure application programming interface (API) usage, infinite loops killed by a watchdog timer, raised exceptions and the like.

The predetermined weak point information may indicate the conditions or requirements for recognizing weak points. In particular, the predetermined weak point information is stored in advance in a storage device such as a ROM. The predetermined weak point information may indicate that a weak point is to be recognized when a particularly unusual test information is obtained. For example, the predetermined weak point information indicates that the test program has a weak point if a same event, such as storing or encrypting, is repeated several times. In embodiments, a weak point is recognized when the obtained test information matches the conditions of the predetermined weak point information. Alternatively, a negative logic may be applied.

In particular, since the test program and the original program are executed in parallel, when a weak point is detected in the test program, the same weak point is also present in the original program.

In particular, the runtime environment is a real environment in which the original program is to be run for a predetermined application rather than an artificial test environment. The weak point of the original program may thus be recognized in the real environment.

Testing of the original program may be dynamically performed while the original program is running. As the testing is performed using a test program, one can speak of a "passive testing".

The original program may be tested in the "real" runtime environment with the "real" libraries, databases and the like. The testing is improved as compared to a test performed on an artificial test environment, because the artificial test environment never covers all possible applications of the original program. Further, testing of the original program may be simplified because there is no need for providing an artificial test environment and for generating artificial input data. Moreover, the testing may be performed with real data rather than with test data, thereby increasing the completeness of the tests significantly.

In particular, testing of the original program according to the method of the first aspect is also less time consuming than testing the original program in an artificial test environment because the testing can be performed while executing the original program.

Furthermore, the testing of the original program is not performed on the original program itself. Rather, it may be performed on the test program running in parallel to the original program, thereby avoiding that the original program runs slow or crashes.

According to an embodiment, the original program and the test program are executed independently from each other. In particular, the original program and the test program are not influenced by the execution of each other.

According to a further embodiment, the method according to the first aspect further comprises:

logging events occurring when executing the test program to obtain log entries as the test information.

In particular, a logging of the events occurring when executing the test program is performed. The logging can be part of the step of obtaining the test information. The events occurring when executing the test program may be safety relevant events. The events can include a storing, an encrypting, a decrypting, a receiving and/or a sending of data, as well as parameters relating thereto.

In embodiments, the logging is performed as the test program is executed. In particular, the logging functionality is part of the test program.

The logging may point out relevant information regarding weak points of the original and/or test program. The result of the logging may be expressed as log entries. The log entries can be a list of relevant events. The log entries can form and/or be part of the already described test information.

According to a further embodiment, the method according to the first aspect further comprises:

monitoring the log entries to recognize a weak point of the original program.

The monitoring may be a permanent analysis of the log entries. For example, the monitoring allows recognizing particular patterns in an order of the logged events, thereby recognizing a race condition or an insecure API usage as a weak point. The monitoring functionality may be part of the test program.

According to a further embodiment, the test information comprises at least:

an execution time of a predetermined part of code of the test program;

an exception occurring when executing the test program;

an information about a cryptographic key used when executing the test program; and/or an order of events occurring when executing the test program.

In particular, a weak point is recognized when the test information is unusual and/or corresponds to the conditions set by the predetermined weak point information.

The test information may include the execution time of a part of code of the test program. If the execution time is higher or lower than expected, a weak point may be detected in view of the predetermined weak point information. For example, it can be determined that infinite loops have been killed by a watchdog timer.

The information about the cryptographic key used when executing the test program may for example include which cryptographic key is used as well as its length. A weak point can be recognized if the information about the cryptographic key is unusual and indicates a weak point in view of the predetermined weak point information.

The test information can further include the order of events occurring when executing the test program. For example, it can indicate that a reception of data occurred first, followed by a decryption, and then by a storing. If the order of events is unusual in view of the predetermined weak point information, a weak point may be recognized.

According to a further embodiment, the method according the first aspect further comprises:

providing a user with a warning information indicating that a weak point has been recognized if it is determined that the original program has a weak point.

The warning information may include the test information, in particular the relevant part in view of the detected weak point. For example, the log entries relevant to the detected weak point are included in the warning information. The warning information can also include the input data that led to the detection of this weak point.

The warning information can be provided to an address within or outside a network in which the original and test programs are executed. The user may evaluate the warning information, in particular manually. The warning information can also be an alarm informing the user of a weak point.

By receiving the warning information, the user may become aware that a weak point has been found and/or may evaluate the weak point. In particular, the user can then take measures against the detected weak point. For example, depending on the result of the evaluation, the user may decide to update the original and/or test program, to inform the manufacturer of the original program about the weak point, to avoid inputting input data that the original program cannot deal with or the like.

According to a further embodiment, the steps of obtaining a test information and of determining whether the original program has a weak point are performed by the test program. In particular, the test program is responsible for performing the logging and monitoring described above.

According to a further embodiment, the method according the first aspect further comprises:

updating the original program and/or the test program in view of a recognized weak point.

In particular, the original program and the test program can be updated to resolve the detected weak point. For example, the code of the original and/or test program can be changed such as to change how the predetermined function is performed. Thereby, the original program can be improved.

The testing functionality of the test program can be updated. For example, the manufacturer of the test program can provide such updates for the test program. It is also possible that the test program itself initiates such updates, in particular in view of learnt patterns.

In embodiments, the predetermined weak point information can also be updated to provide new conditions for recognizing weak points.

According to a further embodiment, the original program and the test program are stored on a same hardware entity, or the original program and the test program are stored on different hardware entities.

According to a second aspect, a test program for recognizing a weak point in an original program is provided, the original program being configured to perform a predetermined function on input data when executed in a predetermined runtime environment. The test program is configured:

to execute the same predetermined function on the input data when executed in the predetermined runtime environment as the original program;

to be executed in parallel to the original program on identical input data as the original program in the predetermined runtime environment;

to provide a test information characterizing the execution of the test program; and to determine whether the original program has a weak point based on a comparison of the test information with a predetermined weak point information indicating conditions for recognizing weak points.

In particular, when executed, the test program performs the predetermined function on the input data and analyses the execution of the predetermined function to detect weak points. To this end, the test program may be configured to execute a testing function in addition to the predetermined function.

According to an embodiment, the test program according to the second aspect is configured to be used as the test program in the method according to the first aspect.

According to a third aspect, a device for recognizing a weak point in an original program using a test program is provided, the original program being configured to perform a predetermined function on input data when executed in a predetermined runtime environment and the test program being configured to execute the same predetermined function on the input data when executed in the predetermined runtime environment as the original program. The device comprises:

an execution entity for executing the original program and the test program in parallel on identical input data in the predetermined runtime environment;

an obtaining entity for obtaining a test information characterizing the execution of the test program; and a determination entity for determining whether the original program has a weak point based on a comparison of the test information with a predetermined weak point information indicating conditions for recognizing weak points.

The execution entity, the obtaining entity and the determination entity may be implemented in hardware and/or in software. If a respective entity is implemented in hardware, it may be embodied as a device, e.g. as a computer or as a processor or as a part of a system, e.g. computer system. If said entity is implemented in software it may be embodied as a computer program product (non-transitory computer readable storage medium having instructions, which when executed by a processor, perform actions), as a function, as a routine, as a program code or as an executable object.

According to an embodiment, the device according to the third aspect is configured to execute the method according to the first aspect.

According to a further embodiment, a computer program product comprising a program code for executing the method according to the first aspect is provided.

A computer program product, such as a computer program means, may be embodied as a memory card, USB stick, CD-ROM, DVD or as a file which may be downloaded from a server in a network. For example, such a file may be provided by transferring the file comprising the computer program product from a wireless communication network.

The embodiments and features described with reference to the method according to the first aspect apply mutatis mutandis to the test program according to the second aspect and to the device according to the third aspect of embodiments of the present invention.

Further possible implementations or alternative solutions of embodiments of the invention also encompass combinations—that are not explicitly mentioned herein—of features described above or below with regard to the embodiments. The person skilled in the art may also add individual or isolated aspects and features to the most basic form of embodiments of the invention.

BRIEF DESCRIPTION

Some of the embodiments will be described in detail, with reference to the following figures, wherein like designations denote like members, wherein.

In the Figures, like reference numerals designate like or functionally equivalent elements, unless otherwise indicated.

DETAILED DESCRIPTION

Figure 1:
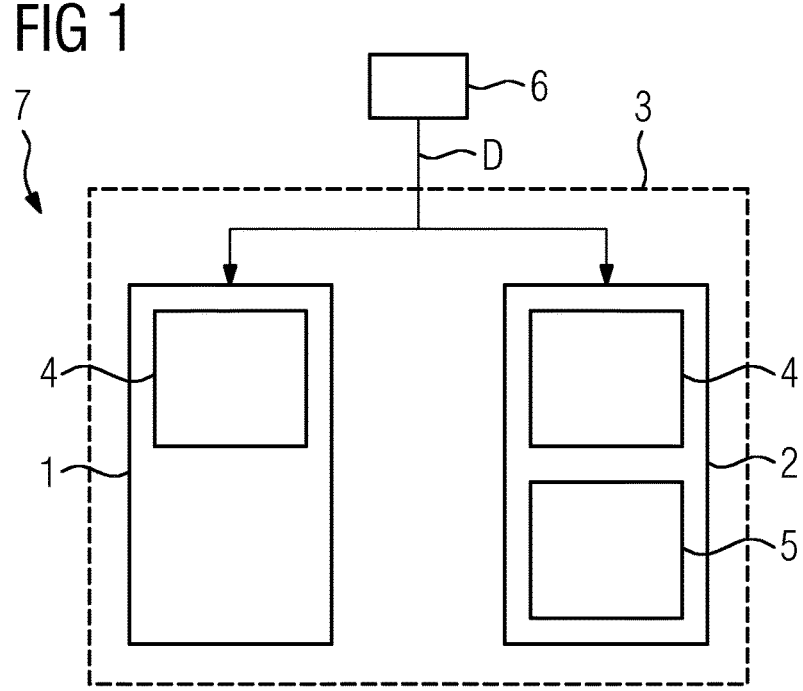
FIG. 1 shows an example of a system with an original program and a test program.

FIG. 1 shows an example of a system 7 comprising an original program 1 and a test program 2. The original program 1 and the test program 2 are computer programs made of software code.

The original program 1 and the test program 2 can both be executed in a predetermined runtime environment 3. For this purpose, both the original program 1 and the test program 2 receive input data D from an interface 6. The input data D may be real sensor data measured by a sensor in an industrial network (not shown).

When executed in the runtime environment 3, the original program 1 and the test program 2 perform a same predetermined function 4 on the input data D. The predetermined function 4 performed on the input data D is a mathematic evaluation of the input/sensor data D. The mathematical evaluation includes retrieving additional data from a database, performing a mathematical operation on the input data D using the additional data, encrypting the result and storing the encrypted result.

Figure 2:
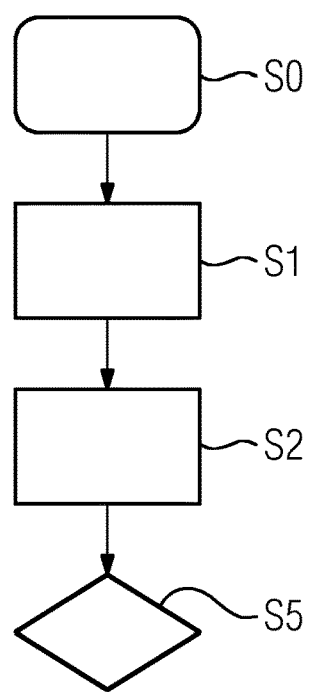
FIG. 2 shows a method for recognizing a weak point in an original program according to a first embodiment.

The system 7 of FIG. 1 is configured to execute a method for recognizing a weak point in an original program 1 according to a first embodiment as shown in FIG. 2. In the following, it will be described how the test program 2 of FIG. 1 can be used to recognize a weak point in the original program 1.

In an initialization step S0, the system 7 of FIG. 1 comprising the original program 1 and the test program 2 is provided.

In a step S1, the original program 1 and the test program 2 are executed in parallel on the same input data D in the runtime environment 3. Namely, the original program 1 performs the predetermined function 4 on the input data D and the test program 2 performs the same predetermined function 4 on the same input data D.

In a step S2, test information is obtained. The test information indicates an order of important/relevant events occurring when the test program 2 is executed. The test information here is a list, including: receiving the input data, retrieving the additional data, performing the mathematical operation, encrypting the result, and storing the encrypted result.

The elements of the list here are log entries obtained by logging events occurring when executing the test program 2. To obtain the test information, the test program 2 executes a testing function 5 (see FIG. 1), which is defined alongside with the predetermined function 4 in the test program 2. The testing function 5 includes the logging functionality.

In a step S3, it is determined whether the original program 1 has a weak point by monitoring the log entries of the test information determined at step S2.

To determine whether the original program 1 has a weak point or not, the testing function 5 of the test program 2 compares the test information obtained at step S2 with a predetermined weak point information provided in the testing function 5.

The predetermined weak point information indicates conditions for recognizing weak points. A weak point in the test program 2 is equivalently a weak point in the original program 1. The predetermined weak point information defines that the original program 1 has a weak point when identical events are repeated according to the test information.

The test program 2 can thus be run in parallel to the original program 1 in the same runtime environment 3, allowing a dynamic testing of the original program 1 under real conditions.

Figure 3:
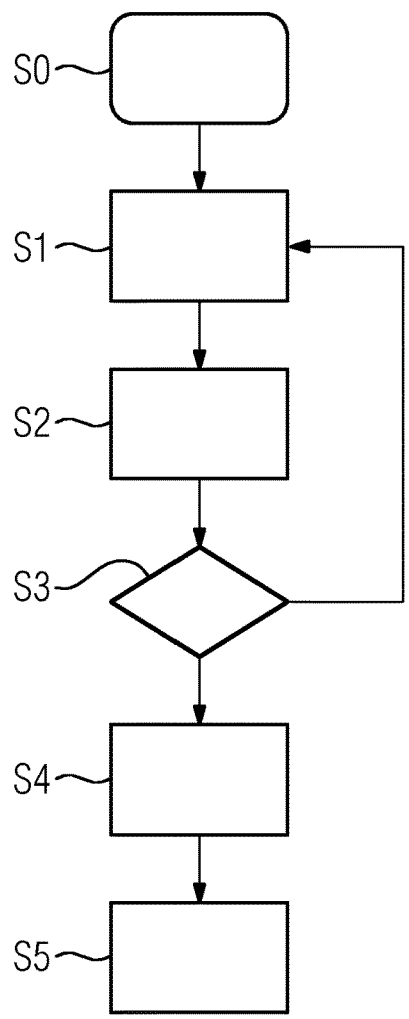
FIG. 3 shows a method for recognizing a weak point in an original program according to a second embodiment.

The system 7 of FIG. 1 can also execute the method for recognizing a weak point in an original program 1 according to a second embodiment as shown in FIG. 3.

The method according to the second embodiment shown in FIG. 3 is an extension of the method according to the first embodiment shown in FIG. 2. Accordingly, only the additional steps S4 and S5 will be described in detail in the following.

As long as no weak point is found in step S3, the steps S1 to S3 are repeated. Every time the steps S1 to S3 are executed, a different input data is used such as to optimize the weak point recognition.

If a weak point is recognized in step S3, a user of the system 7 is provided with a warning information indicating that a weak point has been recognized in step S4. Namely, the test program 2 issues the warning information using the testing function 5 and sends said warning information to the user.

The warning information comprises the log entries relating to the recognized weak point as well as the input data D for which the weak point was recognized. When receiving the warning information, the user analyses it and takes appropriate measures to get around the weak point.

In the step S5, the original program 1 and the test program 2 are updated in view of the recognized weak point. The update of the original program 1 and of the test program 2 is initiated by the user. The original program 1 and the test program 2 are updated identically. Namely, the code of the original program 1 and of the test program 2 is corrected such that the original program and the test program 2 no longer show the detected weak point. Thus, in step S5, the original program 1 and the test program 2 are improved in order to have less weak points.

Figure 4:
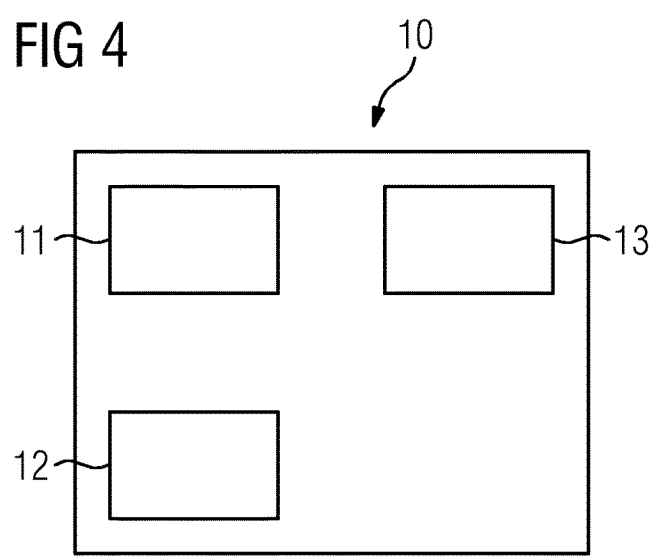
FIG. 4 shows a device for recognizing a weak point in an original program according to an embodiment.

FIG. 4 shows a device 10 for recognizing a weak point in an original program 1 according to an embodiment. The device 10 comprises an execution entity 11, an obtaining entity 12 and a determination entity 13, which may be realized in software.

The execution entity 11 is configured to execute the original program 1 and the test program 2 in parallel on identical input data D in the predetermined runtime environment 3. The obtaining entity 12 is used to obtain the test information. Further, the determination entity 13 can determine whether the original program 1 has a weak point based on a comparison of the test information with the predetermined weak point information.

The device 10 can execute the method for recognizing the weak point in the original program 1 described in view of FIGS. 1 and 2.

Although embodiments of the present invention has been described in accordance with preferred embodiments, it is obvious for the person skilled in the art that modifications are possible in all embodiments. For example, the predetermined function executed by the original program 1 and the test program 2 are not limited to those described in view of FIG. 1. Further, the testing function 5 is not necessarily part of the test program 2, rather, it can be provided as a separate program/functionality. The test information can be any type of information relating to the execution of the test program 2, for example an execution time of a part of code of the test program 2. Further, the steps S1, S2 and S3 can be performed dynamically and at the same time such that a weak point is recognized as the programs 1, 2 are being executed. Moreover, the entities 11, 12 and 13 of the device 10 can be realized as hardware entities.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for recognizing a weak point in an original program using a test program, the original program being configured to perform a predetermined function on input data when executed in a predetermined runtime environment and the test program being configured to execute the same predetermined function on the input data when executed in the same predetermined runtime environment as the original program, wherein the predetermined runtime environment is a real environment for running the original program, wherein the test program is a copy of the original program and is configured to perform all the functions of the original program, wherein the only difference between the original program and the test program is that the test program additionally includes testing functions not included in the original program, the method comprising:
executing the original program and the test program in parallel on identical input data in the predetermined runtime environment, wherein the identical input data is real data from the real environment, wherein the testing functions log events occurring when executing the test program in the real environment;
obtaining a test information characterizing the execution of the test program from the testing functions, wherein the test information includes log entries; and
monitoring the log entries and determining whether the original program has a weak point based on a comparison of the test information with a predetermined weak point information provided in the testing function.

2. The method according to claim 1, wherein the original program and the test program are executed independently from each other.

3. The method according to claim 1, wherein the test information comprises at least:
an execution time of a predetermined part of code of the test program;
an exception occurring when executing the test program;
an information about a cryptographic key used when executing the test program; and/or
an order of events occurring when executing the test program.

4. The method according to claim 1, further comprising:
providing a user with a warning information indicating that the weak point has been recognized if it is determined that the original program has the weak point.

5. The method according to claim 1, wherein the steps of obtaining a test information and of determining whether the original program has the weak point are performed by the test program.

6. The method according to claim 1, further comprising: updating at least one of the original program and the test program in view of the recognized weak point.

7. The method according to claim 1, wherein the original program and the test program are stored on a same hardware entity, or wherein the original program and the test program are stored on different hardware entities.

8. A computer program product, comprising a non-transitory computer readable hardware storage device having computer readable program code stored therein, said program code executable by a processor of a computer system to implement a method, comprising a program code for executing the method according to claim 1.

9. A computer program product, comprising a non-transitory computer readable hardware storage device having computer readable program code stored therein, said program code executable by a processor of a computer system to implement a test program for recognizing a weak point in an original program, the original program being configured to perform a predetermined function on input data when executed in a predetermined runtime environment, wherein the predetermined runtime environment is a real environment for running the original program, wherein the test program is a copy of the original program and is configured to perform all the functions of the original program, wherein the only difference between the original program and the test program is that the test program additionally includes testing functions not included in the original program,
the test program being configured:
to execute the same predetermined function on the input data when executed in the same predetermined runtime environment as the original program;
to be executed in parallel to the original program on identical input data as the original program in the predetermined runtime environment, wherein the identical input data is real data from the real environment, wherein the testing functions log events occurring when executing the test program in the real environment;
to provide a test information characterizing the execution of the test program from the testing functions, wherein the test information includes log entries; and
to monitor the log entries and determine whether the original program has a weak point based on a comparison of the test information with a predetermined weak point information provided in the testing function.

10. A device for recognizing a weak point in an original program using a test program, the original program being configured to perform a predetermined function on input data when executed in a predetermined runtime environment and the test program being configured to execute the same predetermined function on the input data when executed in the same predetermined runtime environment as the original program, wherein the predetermined runtime environment is a real environment for running the original program, wherein the test program is a copy of the original program and is configured to perform all the functions of the original program, wherein the only difference between the original program and the test program is that the test program additionally includes testing functions not included in the original program,
the device comprising:
an execution entity for executing the original program and the test program in parallel on identical input data in the predetermined runtime environment, wherein the identical input data is real data from the real environment, wherein the testing functions log events occurring when executing the test program in the real environment;

an obtaining entity for obtaining a test information characterizing the execution of the test program from the testing functions, wherein the test information includes log entries; and a determination entity for monitoring the log entries and determining whether the original program has a weak point based on a comparison of the test information with a predetermined weak point information provided in the testing function.

11. The device according to claim 10, which is configured to execute a method comprising:

executing the original program and the test program in parallel on identical input data in the predetermined runtime environment, wherein the identical input data is real data from the real environment, wherein the testing functions log events occurring when executing the test program in the real environment;

obtaining the test information characterizing the execution of the test program; and determining whether the original program has the weak point based on a comparison of the test information with the predetermined weak point information provided in the testing function.

* * * * *